United States Patent [19]

von Kamienski et al.

[11] 4,328,253
[45] May 4, 1982

[54] METHOD OF APPLYING FLAVORINGS AND EDIBLE FATS ON TO DEEP-FROZEN FOODS WITH FREE APPORTIONABILITY SO AS TO OBTAIN FOOD READY FOR CONSUMPTION MERELY AFTER ADDING WATER AND APPLYING HEAT

[76] Inventors: Elard S. von Kamienski, Am Menkebach 11a, 4800 Bielefeld 1; Heiner Löffler, Am Heidewald 18, 4830 Gutersloh, both of Fed. Rep. of Germany

[21] Appl. No.: 134,564

[22] Filed: Mar. 27, 1980

[30] Foreign Application Priority Data

Jul. 4, 1979 [DE] Fed. Rep. of Germany ....... 2926992

[51] Int. Cl.³ .............................................. A23L 1/40
[52] U.S. Cl. .................................... 426/307; 426/100; 426/302; 426/589
[58] Field of Search ................ 426/589, 99, 100, 524, 426/293, 615, 294, 302, 307, 289, 305

[56] References Cited

U.S. PATENT DOCUMENTS

| | | | |
|---|---|---|---|
| 1,380,815 | 6/1921 | Luft | 426/589 |
| 2,357,585 | 9/1944 | Galvin | 426/589 |
| 2,724,651 | 11/1955 | Hampton | 426/293 X |
| 2,801,930 | 8/1957 | Paulucci | 426/589 X |
| 2,910,370 | 10/1959 | Rogers | 426/293 X |
| 3,119,691 | 1/1964 | Ludington | 426/589 X |
| 3,395,022 | 7/1968 | Vollink | 426/524 X |
| 3,567,468 | 3/1971 | Tressler | 426/589 X |
| 3,607,313 | 10/1971 | Roth | 426/302 |
| 3,765,910 | 10/1973 | Chaplon | 426/524 X |
| 3,868,470 | 2/1975 | Fallon | 426/302 |
| 3,987,207 | 10/1976 | Spaeti | 426/589 X |
| 4,199,603 | 4/1980 | Sortwell | 426/100 X |
| 4,220,622 | 9/1980 | Bengtsson | 426/615 |

FOREIGN PATENT DOCUMENTS

| | | | |
|---|---|---|---|
| 701831 | 1/1965 | Canada | 426/100 |
| 5010942 | 9/1969 | Japan | 426/589 |
| 486090 | 5/1938 | United Kingdom | 426/100 |
| 643145 | 9/1977 | U.S.S.R. | 426/589 |

Primary Examiner—Robert Halper
Attorney, Agent, or Firm—J. Gibson Semmes; Joseph Shortill

[57] ABSTRACT

A method of applying flavorings and edible fats on to deep-frozen foods with free apportionability so as to obtain a food product ready for consumption merely by adding water and applying heat, characterized in that the intended flavoring and aromatic substances are prepared in a separate mixture and swelling substances are incorporated into this mixture, which swelling substances are capable of binding, as a result of their swelling characteristics, the free water occurring during the mixing with the deep-frozen products and also in the end product, to such an extent that a free-flowing mixture is obtained.

3 Claims, No Drawings

METHOD OF APPLYING FLAVORINGS AND EDIBLE FATS ON TO DEEP-FROZEN FOODS WITH FREE APPORTIONABILITY SO AS TO OBTAIN FOOD READY FOR CONSUMPTION MERELY AFTER ADDING WATER AND APPLYING HEAT

The present invention relates to a method of applying flavourings and edible fats on to deep-frozen foods with free apportionability so as to obtain food ready for consumption merely after adding water and applying heat.

The method according to the invention comprises the application of flavourings and edible fats on the deep-frozen foods of a lumpy nature or mixtures, consisting mainly of vegetables, pasta, rice and also meat products, with the aim of achieving a partial or complete menu merely by adding water and applying thereto a simple cooking or heating process. The product is free-flowing and can thus be portioned out as desired. Even in the un-thawed state the apportionability is essentially retained.

In the hitherto known products a paste containing the flavourings is added to the lumpy vegetable ingredients, pasta or meat products. Thus the individual ingredients of a partial or complete course are not enveloped by the flavour-enhancing substances. Accordingly, apportionability is not possible, since it is always necessary for a specific portion of the lumpy ingredients to be associated with an accurately defined quantity of seasoning or flavouring substances, i.e. pastes.

In the method according to the invention, initially the intended flavourings and aromatic substances are prepared in a separate mixture with thickening agents, for example starch, flour, etc. Swelling substances are worked into this mixture, which substances, as a result of their swelling property, are capable of binding the free water occurring during the mixing with the deep-frozen products and also in the end product, to such an extent that a free-flowing mixture is still obtained. Particularly suitable swelling substances are, for example, cellulose derivatives, cold-swelling starch, vegetable thickening agents, gelatin and other similar materials.

After this, a vibrating screen or sieve is used to remove as far as possible any condensed water, i.e. frost, which may adhere to the deep-frozen lumpy ingredients as a result of the freezing or storage process.

The pretreated, lumpy deep-frozen product, which is rendered substantially frostless and which may be raw, blanched or precooked produce, is then placed in a mixing cylinder. During the movement of the lumpy matter in this mixing cylinder, edible fats as well as mixtures of edible fats with aromatic and flavouring substances are sprayed from nozzles on to the deep-frozen matter, so that to some extent a thin film of fat is formed on the lumpy product particles themselves.

Only after this is the aforementioned separate dry mixture placed in the mixing drum. The already mentioned swelling substances cause the dry mixture to adhere to the premix.

According to the desired ratio of dry mixture to lumpy produce, it has proven advantageous to spray on part of the added fat only subsequently, so as to achieve granulation of the flavouring/fat substances.

According to requirements, such a mixture may be produced with or without fat.

According to the ratio of dry matter to lumpy produce, the resultant product may consist, on the one hand in the case of little added dry matter, of an almost completely effected enveloping of the lumpy produce with the dry matter and, on the other hand in the case of a greater addition of dry matter, may consist of the lumpy produce and of small granules of the flavouring and fat ingredients. However, the granules adhere so well to the lumpy deep-frozen ingredients that no segregation takes place and free apportionability is provided.

The invention will be further described in connection with the following example, which is for purposes of illustration only:

| (a) Soup composition: | |
|---|---:|
| Frozen onions | 74.00% |
| Wine concentrate | 2.00% |
| Fat (vegetable or animal) | 6.00% |
| Granular mixture according to the description | 17.00% |
| Cold-swelling thickening agents | 1.00% |
| | 100.00% |
| (b) Basic composition: | |
| Salt | 20.55% |
| Aromatic substances (meat, flavourings) | 25.00% |
| Seasoning (pepper, marjoram, thyme) | 1.50% |
| Sugar | 18.30% |
| Starch (potato) | 22.10% |
| Grated cheese | 10.30% |
| Lemon juice | 0.80% |
| Glutamate | 1.45% |
| | 100.00% |

(c) Adhesion of pastes
Mode of procedure
1. Mix vegetables.
Feed onions at a temperature of at least −20° C. via a grinder into the mixer and mix.
2. Apply white-wine concentrate.
During mixing process, spray white-wine concentrate uniformly on to vegetables using a metering device.
3. Adhesion of fat
Mix beef bone fat and vegetable fat, heat and bring to a temperature of +30° C. Adhesion of part of the fat (approximately one half) during the mixing process.
4. Prepare dry mixture
Mix dry ingredients uniformly in a mixing granulator.
5. Adhesion of dry mixture
Place entire dry mixture in the mixer. Distribute remaining fat by means of metering device on to soup mixture and granulate finely.
6. Adhesion of thickening agent
sprinkle thickening agent uniformly and effect adhesion.

We claim:
1. A method of preparing freely apportionable deep-frozen foods comprising the steps of:
   (a) grinding the deep frozen food ingredients thereof and pretreating said ingredients with a vibrating screen or sieve to remove substantially all of the frost therefrom;
   (b) placing the pretreated deep-frozen ingredients of step (a) into a mixing cylinder;
   (c) spraying a portion of edible fats onto the pretreated ingredients during movement thereof within said mixing cylinder to produce a premix wherein a thin film of fat is partially formed on the respective food ingredients;
   (d) preparing a separate dry mixture of flavorings, aromatic substances, and swelling substances;
   (e) admixing said separate dry mixture with said premix.

2. The method according to claim 1, wherein said step of spraying (c) includes spraying a mixture of edible fats, aromatic substances, and flavorings.

3. The method according to claim 2, wherein said step of spraying includes spraying multiple portions and wherein at least one of said multiple portions is sprayed on subsequently to step (e) of admixing, to produce a granulation of said mixture of edible fats, aromatic substances, and flavorings.

* * * * *